United States Patent [19]
Bagley et al.

[11] Patent Number: 5,737,535
[45] Date of Patent: Apr. 7, 1998

[54] FLOW CONTROL CIRCUIT FOR NETWORKED COMMUNICATIONS SYSTEM INCLUDING ARRANGEMENT FOR REDUCING OVERHEAD AT THE BEGINNING OF A COMMUNICATIONS SESSION BY ENABLING MESSAGE TRANSMISSION BEFORE RECEIVING FLOW CONTROL INFORMATION

[75] Inventors: Norman J. Bagley, Wakefield; Brian E. Gallagher, Marlboro, both of Mass.

[73] Assignee: EMC Corporation, Hopkinton, Mass.

[21] Appl. No.: 484,460

[22] Filed: Jun. 7, 1995

[51] Int. Cl.$^6$ .................................................. G06F 13/00
[52] U.S. Cl. ........................ 395/200.57; 395/200.62; 395/200.64; 395/200.55; 395/200.8; 395/849
[58] Field of Search .................... 395/200.34, 200.55, 395/200.47, 200.57, 200.62, 200.67, 200.64, 200.8, 200.3, 849

[56] References Cited

U.S. PATENT DOCUMENTS 5,165,020  11/1992  Sudama et al. .............. 395/200.12
5,418,912   5/1995  Christenson ................ 395/200.13

*Primary Examiner*—Jack B. Harvey
*Assistant Examiner*—Ario Etienne
*Attorney, Agent, or Firm*—Richard A. Jordan; Mark J. Casey; John M. Gunther

[57] ABSTRACT

A computer system for connection in a network, which has a number of other devices each of which may receive communications from the computer system. The computer system includes a network interface and a message transmission control circuit. The network interface establishes a communications session with a selected one of the other devices as a destination for transmitting messages to the selected device. The message transmission control circuit enables the network interface to establish a communications session and transmit messages thereover with the selected device. The message transmission control circuit initially enables the network interface to transmit a number of messages corresponding to a log-in credit value selected for the selected device. Thereafter, the message transmission control circuit enables the network interface to transmit message based on flow control information received from the selected device. This reduces the amount of overhead required at the beginning of a communication session by allowing the computer system to transmit a number of messages corresponding to the selected log-in credit value prior to getting flow control information from the selected device.

22 Claims, 4 Drawing Sheets

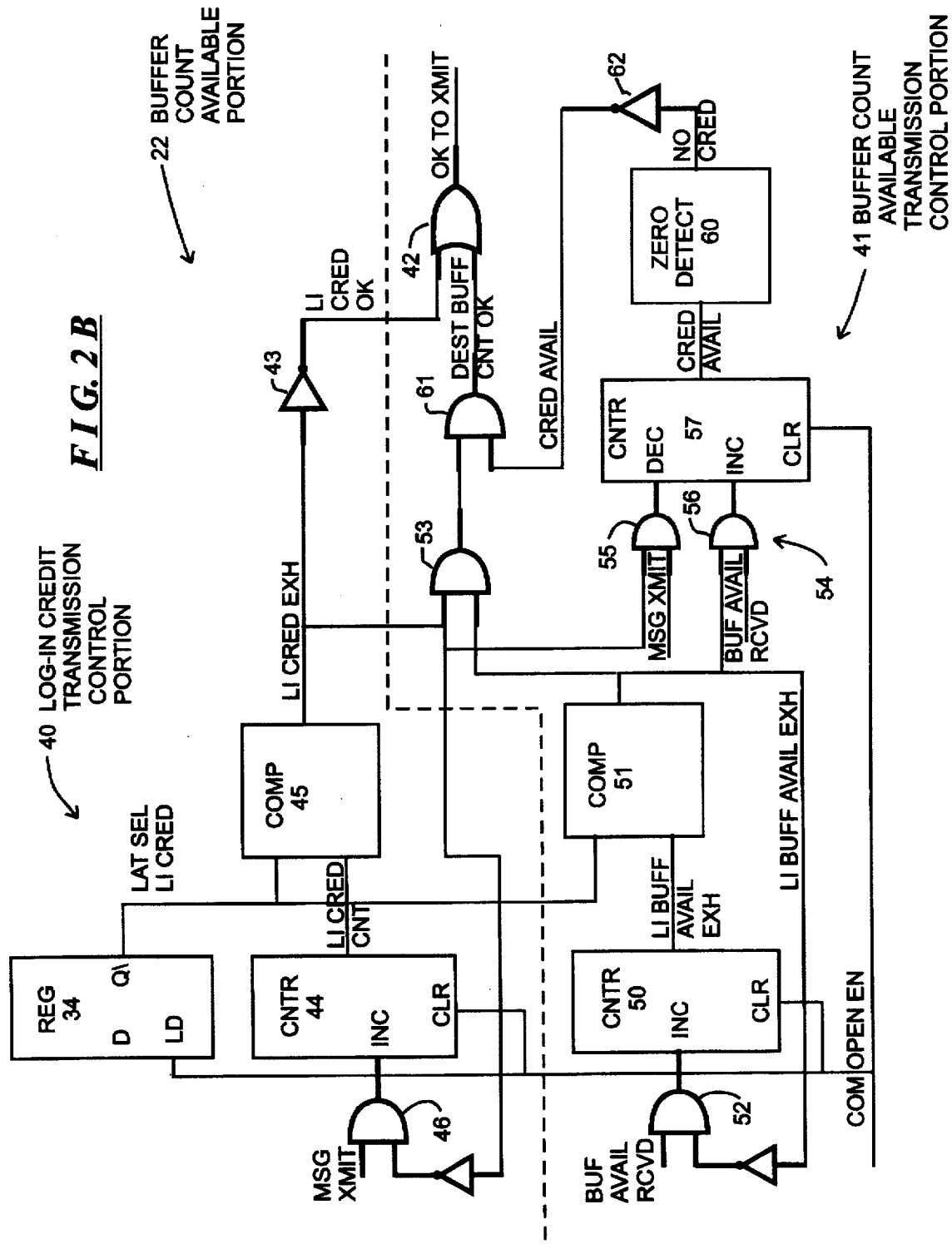

FLOW CONTROL CIRCUIT FOR NETWORKED COMMUNICATIONS SYSTEM INCLUDING ARRANGEMENT FOR REDUCING OVERHEAD AT THE BEGINNING OF A COMMUNICATIONS SESSION BY ENABLING MESSAGE TRANSMISSION BEFORE RECEIVING FLOW CONTROL INFORMATION

FIELD OF THE INVENTION

The invention relates generally to the field of digital data processing systems and more particularly to arrangements for controlling message flow among computer systems in a computer network.

BACKGROUND OF THE INVENTION

In modern "enterprise" digital data processing systems, that is, computer systems for use in an office environment in a company, a number of personal computers, workstations, and other devices such as mass storage subsystems, network printers and interfaces to the public telephony system, are typically interconnected in a computer network. The personal computers and workstations are used by individual workers to perform processing in connection with data and programs that may be stored in the network mass storage subsystems; the personal computers/workstations, operating as clients, download the data and programs from the network mass storage subsystems process the data in connection with the programs and enable the processed data to be uploaded to the network mass storage subsystems for storage, to a network printer for printing, or to the telephony interface for transmission over the public telephony system. In such an arrangement, the network mass storage subsystems, network printers and telephony interface operate as servers, since they are available to service requests from all of the clients in the network. By organizing the network in such a manner, the servers are readily available for use by all of the personal computers/workstations in the network. Such a network may be spread over a fairly wide area, with the personal computers/workstations are interconnected by communication links such as electrical wires or optic fibers.

One problem that arises in a network is the control of message flow between each computer system, operating as a source of messages, and another computer system, operating as a destination that receives messages from the source. Typically, when a communications session is established between source and destination computer systems, the systems will engage in a dialog in which initial flow control information is exchanged, which they will update during the session.

SUMMARY OF THE INVENTION

The invention provides a new and improved arrangement for controlling message flow among computer systems in a computer network, particularly reducing the overhead required at the beginning of a communications session.

In brief summary, the invention in one aspect is directed to a computer system connected in a network, which has a number of other devices each of which may receive communications from said computer system. The computer system includes a network interface and a message transmission control circuit. The network interface establishes a communications session with a selected one of said other devices as a destination and transmits messages to said selected device. The message transmission control circuit enables the network interface to transmit messages to the selected device. The message transmission control circuit initially enables said network interface to transmit a number of messages corresponding to a log-in credit value selected for the selected device. Thereafter, the message transmission control circuit enables the network interface to transmit message based on flow control information received from the selected device.

In another aspect, the invention provides a computer system for connection in a network, the network having a number of other devices each of which is adapted to receive communications from said computer system. The computer system includes a message transmission control circuit for enabling transmission of messages over said network. The message transmission control circuit includes a network interface and a log-in credit circuit. The network interface establishes a communications session with a selected one of said other devices and controls the transmission of messages in connection with said communications session, each message including a destination identifier identifying the selected device. The network interface transmits messages at a rate determined by a credits value. The log-in credit circuit includes a log-in credit store including a plurality of log-in credit store entries each storing a log-in credit value and a log-in selector for selecting one of the log-in credit store entries in response to a destination identifier for a message to be transmitted to a destination device and provides the log-in credit value from the selected log-in credit store entry for use by the network interface as the credits value to control transmission of messages thereby at the beginning of a communications session.

In yet another aspect, the invention provides a computer system for connection in a network, the network having a number of other devices each of which is adapted to transmit communications to said computer system. The computer system includes a message transfer control circuit for enabling transmission of messages over, and reception of messages from, said network. The message transfer control circuit stores received messages in communications buffers, and further includes a destination buffer count available circuit for generating flow control information to be provided to a transmitting device to identify availability of buffers for storing messages to be transmitted thereby. The destination buffer count available circuit includes an available receive buffer counter, a releasable receive buffer counter, and a control logic. The available receive buffer counter maintains an available buffers value identifying the number of empty communications buffers, the available receive buffer counter being decremented in response to the receipt of a message and incremented when a message is drained from one of said communications buffer. The releasable receive buffer counter maintains a releasable buffers available value that identifies the number of communications buffers that may be allocated to receive messages during a communications session, and in particular is (i) loaded with a current available buffers value from the available receive buffer counter when the communications session is established, (ii) incremented in response to draining of a message from one of said communications buffers and (iii) decremented in response to transmission of flow control information allocating one of said communications buffers to receive a message. The control logic enables the transmission of flow control information indicating allocation of one of said communications buffers to receive a message.

In yet another aspect, the invention provides a method of controlling transmission of messages by a computer system over a network. In accordance with the method, a communications session is established with a selected one of said other devices for controlling the transmission of messages, with the rate of message transmission being determined by a credits value. Each message includes a destination identifier identifying the selected device. A log-in credit value is established for use as an initial credits value during the communications session according to the following steps. A log-in credit store is provided including a plurality of log-in credit store entries each with a log-in credit value. One of the log-in credit store entries is selected in response to a destination identifier for a message to be transmitted to a destination device and provides the log-in credit value from the selected log-in credit store entry for use by the network interface as the credits value to control transmission of messages thereby at the beginning of a communications session.

Yet another aspect of the invention provides a method of operating a computer system for connection in a network, the network having a number of other devices each of which is adapted to transmit communications to said computer system. The computer system enables transmission of messages over, and reception of messages from, said network, the computer system storing received messages in communications buffers. The computer system, in accordance with the method, generates flow control information for controlling the transmission of messages by another device to be received in the communications buffers. In accordance with the method, an available buffers value is maintained identifying the number of empty communications buffers, the available receive buffer counter being decremented in response to the receipt of a message and incremented when a message is drained from one of said communications buffer. A releasable buffers available value is maintained identifying the number of communications buffers that may be allocated to receive messages during a communications session. The initial releasable buffers available value, established at the beginning of a session, corresponds to the then-current available buffers value when the communications session is established. The releasable buffers available value is incremented in response to draining of a message from one of said communications buffers and decremented in response to transmission of flow control information allocating one of said communications buffers to receive a message. The flow control information is transmitted over the network to indicate allocation of one of said communications buffers to receive a message.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2A and 2B together depict a schematic logic diagram of a message transmission control circuit used in a message source computer system in the network depicted in FIG. 1 for controlling the transmission of messages.

DETAILED DESCRIPTION OF AN ILLUSTRATIVE EMBODIMENT

Figure 1:
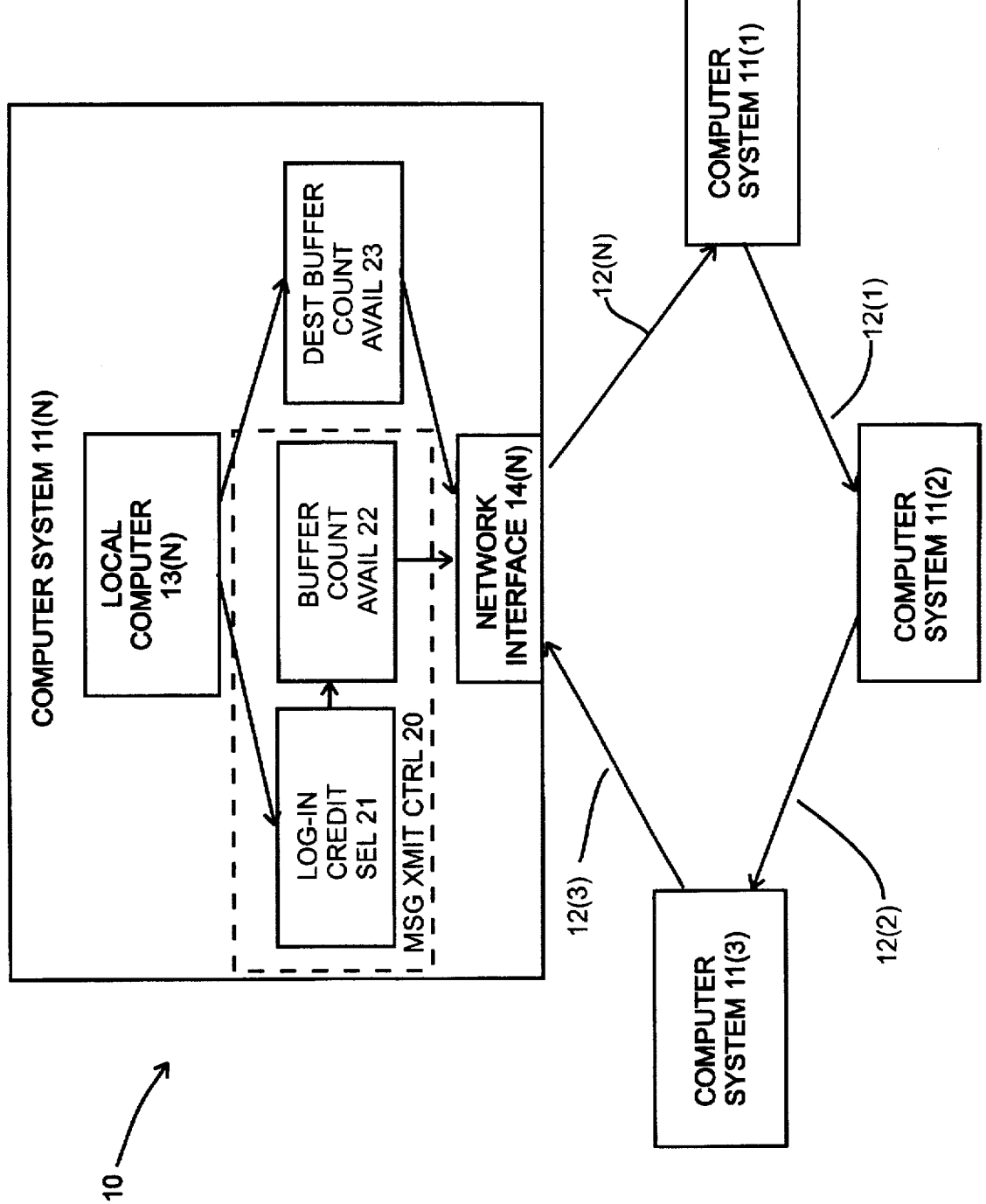
FIG. 1 is a functional block diagram of a computer network constructed in accordance with the invention.

FIG. 1 is a general schematic diagram of a computer network 10 constructed in accordance with the invention.

With reference to FIG. 1, the computer network includes a plurality of computer systems 11(1) through 11(N) (generally identified by reference numeral 11(n)) which are interconnected by communication links 12(1) through 12(N) (generally identified by reference numeral 12(n)). In the embodiment depicted in FIG. 1, the computer network 10 is in the form of a ring topology, so that each communication link 12(n) connects the correspondingly indexed computer system 11(n) to computer system 11(n+1), although it will be appreciated that the invention may be used in connection with networks of other topologies. In addition, in one embodiment the communication links 12(n) are in the form of optical fibers, over which communications proceed serially, although it will be appreciated that other media may also be used.

The computer systems 11(n) depicted in FIG. 1 may all generally be similar. An illustrative computer system 11(n) includes a conventional computer 13(n), including a local processor (not separately shown) which performs processing operations in connection with data and instructions stored in a local memory and local mass storage device (also not separately shown). In addition, the computer may also include operator input devices such as a keyboard and/or mouse device which allow an operator to input data and control information for controlling processing, a display device such as a video display for displaying status and processed data to the operator, and a local printer for generating hardcopy output (not separately shown).

The illustrative computer system 11(n) will also include a network interface 14(n) which interfaces the computer 13 to the communication links 12(n) and 12(n−1) to facilitate communications with other computer systems in the network 10. Information is transferred over the network in the form of messages, with each message including an address, identifying the computer system 11(n) to receive the message, and data. The network interface 14(n) will include arrangements for transmitting messages over communication link 12(n) to the next computer system 11(n+1) in the system, and for receiving messages over communication link 12(n−1) from the preceding computer system 11(n−1) in the system. If the network interface 14(n) receives a message whose address identifies the computer system 11(n), it will receive the message and couple the data to the local computer 13(n) for processing. On the other hand, if the network 14(n) receives a message whose address identifies another computer system in the network 10, it will couple the message from the communication link 12(n−1) to the next communication link 12(n) to transfer the message to the next computer system 12(n+1).

Although the network 10 has been described as including a number of computer systems 11(n), it will be appreciated that a number of types of systems may be connected in the network 10, including for example, mass storage subsystems for storing data or programs which may be accessed by one or a number of computer systems 11(n) in the network 10, interfaces to other networks or the public telecommunications systems, hardcopy output devices such as network printers, and the like. Further, although network 10 has been described as comprising a plurality of computer systems 11(n) and other system devices interconnected by communication links 12(1) through 12(N) (generally identified by reference numeral 12(n)), it will be appreciated that they may be used within a particular device or subsystem to interconnect various components within the subsystem. For example, it may be used in a mass storage subsystem including a system interface/controller and a number of storage devices such as disk or tape storage devices, for use in controlling transfers of control information and data between the system interface/controller and the storage devices.

The invention provides an arrangement for controlling communications among the various computer systems 11(n) in the network 10. As is conventional, units in the network 10 communicate by transmitting messages over the communication links 12(n). Typically, during a communications session, information is transmitted from a source computer system 11(s) to a destination computer system 11(d). The destination computer system 11(d) will provide a number of communications buffers into which data from the source computer system 11(s) will be buffered. Generally, at the beginning of a session, the source and destination computer systems will engage in a dialog in which, among other things, the destination computer system 11(d) will notify the source computer system 11(s) of an initial number of buffers which are available. As the source computer system 11(s) transmits data to the destination, it keeps track of the amount of data that it transmits so that, when the amount of data transmitted reaches the number of buffers available, it will stop transmitting. At the other party to the communications session, the destination computer system 11(d) contemporaneously drains the received data from the buffers for processing, and in so doing frees the buffers to receive data from further communications. As it frees each buffer, the destination computer system 11(d) will notify the source computer system 11(s) in, for example, an acknowledgment message transmission, and the source computer system 11(s) may use that information in determining the number of buffers available at the destination. Accordingly, the source computer system 11(s) will maintain a count as to the number of buffers available at the destination. As the source computer system 11(s) transmits data to the destination, it will reduce the available buffers count but, as it receives notifications from the destination computer system 11(d) it will increase the buffers available count.

It will be appreciated that, during a communications session between two computer systems $11(n_1)$ and $11(n_2)$, both computer systems may operate as both a source computer system and as a destination computer system to provide duplex (bidirectional) communications therebetween. In that case, each of the computer systems $11(n_1)$ and $11(n_2)$ will provide both the source computer system and destination computer system facilities as described herein.

In accordance with the invention, to reduce the initialization message traffic between a source computer system 11(s) and a destination computer system 11(d) in a communications session, each computer system 11(n) is provided with a log-in credit value for communications with each of the other computer systems in the network 10. More specifically, each computer system, when operating as a source computer system 11(s), can make use of two or more predetermined log-in credit values (one of which may be zero), with each log-in credit value identifying the number of buffers that a destination computer system 11(d) will guarantee will be available at the beginning of a communications session. Each computer system, when operating as a source computer system 11(s), will also maintain a pointer for each of the possible destination computer systems 11(d) pointing to the particular log-in credit value which may be used for that destination computer system 11(d). A computer system, when operating as the source computer system 11(s), when it begins a communications session with a destination computer system 11(d), will select a log-in credit value pointed to by the destination computer system's pointer, and use that log-in credit value at the beginning of the communication session. In this arrangement, the source computer system 11(s) may transmit data to the destination computer system 11(d) prior to receiving buffers available count information from the destination computer system 11(d), with the amount of data being based on the log-in credit value.

Figure 2A:
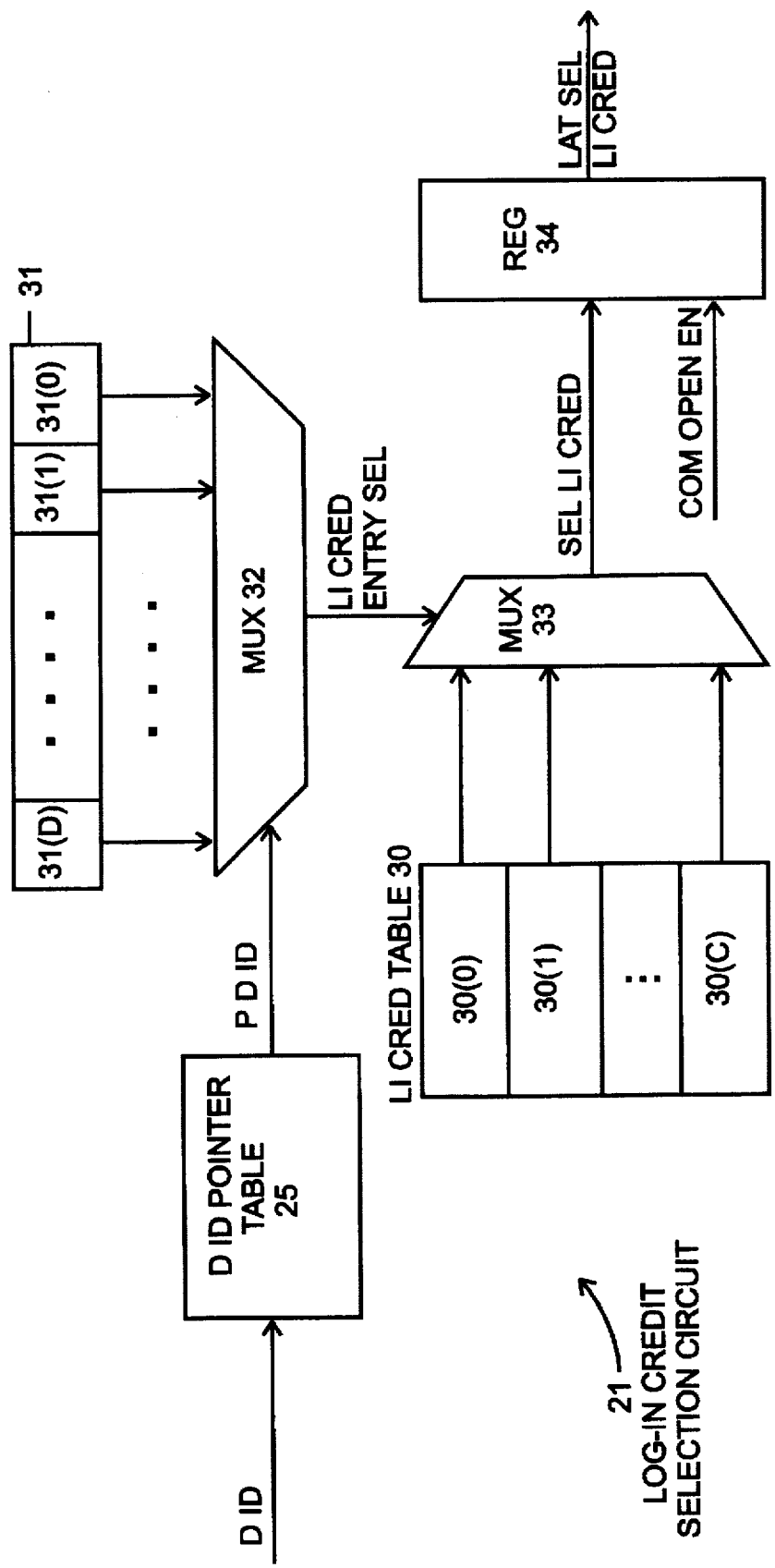
Figure 3:
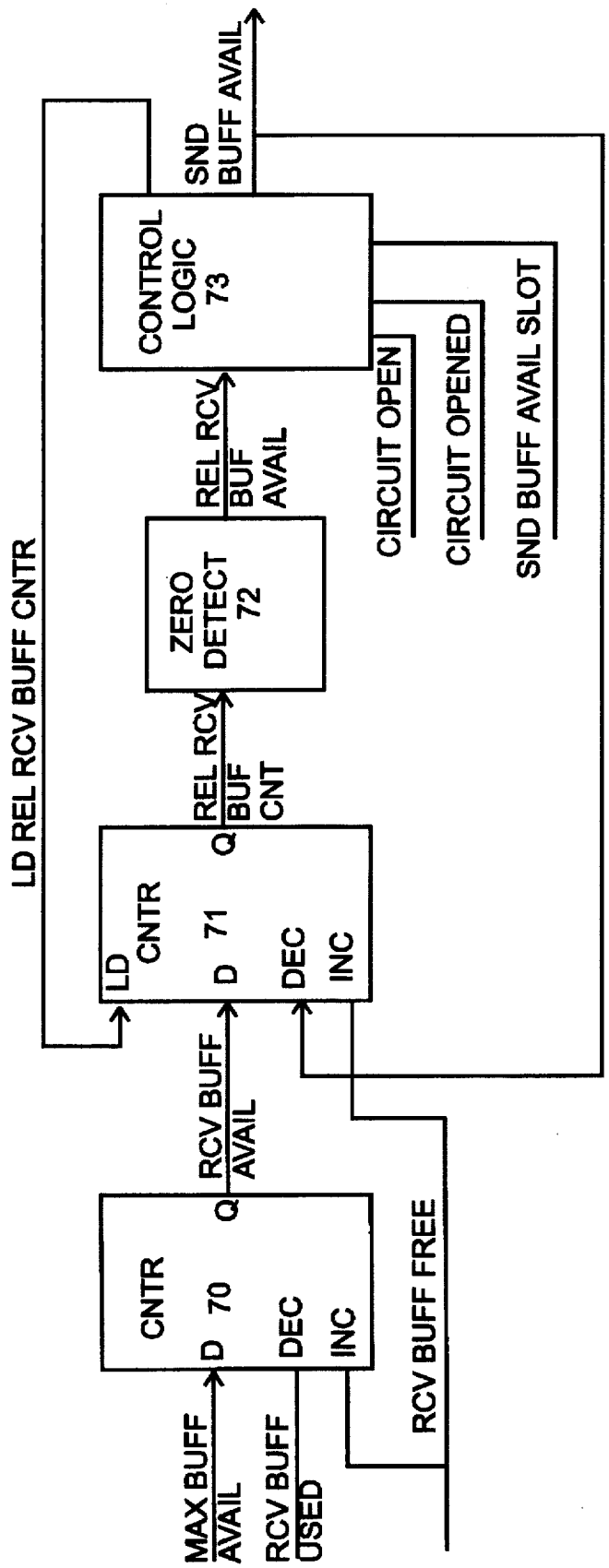
FIG. 3 depicts a schematic logic diagram of a destination buffer count available circuit used in a message destination receiving computer system in the network depicted in FIG. 1 to determine the number of buffers that it has available for messages from the message source computer system.

FIGS. 2A and 2B together depict a schematic logic diagram of a message transmission control circuit 20 for use by the network interface 14(n) in controlling transmission of messages by a computer system operating as a source computer system 11(s) in response to buffer available count information, including both the log-in credit information and buffer count available information it receives from the destination computer system 11(d). FIG. 2A depicts a log-in credit selection circuit 21 used by the source computer system 11(s) to select a log-in credit, and FIG. 2B depicts a buffer count available circuit 22 used by the source computer system 11(s) to maintain a count of the number of buffers available at the destination computer system 11(d). FIG. 3 depicts a schematic logic diagram of a destination buffer count available circuit 23 used by the destination computer system 11(d) to determine the number of buffers that it has available and control the transmission of buffer available count information to the source computer system 11(s).

With reference to FIG. 2A, the log-in credit selection circuit 21 includes a log-in credits table 30 and a destination credit pointer table 31. The log-in credits table 30 includes a number of entries 30(0) through 30(C) (generally identified by reference numeral 30(c)), each of which stores a possible log-in credit value which the source computer system 11(s) may use at the beginning of a communications session with any of the other computer systems as destination computer systems. The destination credit pointer table 31 also includes a number of entries 31(0) through 31(D) (generally identified by reference numeral 31(d)) each of which is associated with one of the other computer systems in the network 10 which may be a destination computer system 11(d). Each entry 31(d) contains a pointer which identifies the entry 30(c) in the log-in credits table which may be used with the associated destination computer system 11(d).

At the beginning of a communications session with a particular destination computer system 11(d), a destination identifier D ID identifying the destination computer system 11(d) is provided by to table 25 which, for each destination identifier D ID, provides pointer P D ID to an entry 31(d) to a destination pointer selector 32 in the log-in credits selection circuit 21. The destination pointer selector 32, in turn, selects an entry 31(d) in the destination credit pointer table, whose contents are, in turn, coupled to a log-in credits selector 33 as a LI CRED ENTRY SEL log-in credits entry select signal. The LI CRED ENTRY SEL signal, in turn, selects one of the entries 30(c) of the log-in credits table 30, whose contents are coupled as a SEL CRED selected credits signal to the input terminal of a log-in credits register 34. The log-in credits register 34, in turn, is enabled to load the SEL CRED selected credits signal in response to the assertion of a COM OPEN EN communications open enable signal, which the network interface 14 asserts at the beginning of a communications session. Accordingly, in the source computer system 11(s), the log-in credit selection circuit 21 will select a log-in credits value and load it into the log-in credit register 34 at the beginning of a communications session, based on the D ID destination identifier of the computer system which is to operate as the destination computer system 11(d).

After the log-in credit value is selected for the communications session, the buffer count available circuit 22 (FIG.

2B) uses the log-in credit value, along with buffer count available information received by the source computer system 11(s) from the destination computer system 11(d), in controlling the rate of transmission of data by the source computer system 11(s).

In particular, the buffer count available circuit 22 initially enables the network interface 14(s) of the source computer system 11(s) to transmit a number of messages corresponding to the log-in credits value selected for the destination computer system 11(d) and stored in the register 34 at the beginning of a communications session, and to continue transmitting after it has transmitted a number of messages corresponding to the log-in credits value while the total number of messages (including the initial messages) is less than the number of buffers available as indicated by the destination computer system 11(d). It will be noted that, in the embodiment described herein, the source computer system 11(s) will not add the log-in credits value to the buffer count available information that it receives from the destination computer system 11(d) in controlling the transmission of data.

With reference to FIG. 2B, the buffer count available circuit 22 includes a log-in credit transmission control portion 40 and a buffer count available transmission control portion 41. The log-in credit transmission control portion 40, in response to the log-in credits value stored in the log-in credits register 34, generates a LI CRED EXH log-in credits exhausted signal which, while negated, enables the source computer system 11(s) to transmit. The log-in credit transmission control portion 40 will maintain the LI CRED EXH signal in a negated condition, enabling the source computer system 11(s) to transmit, until the transmissions corresponds to the log-in credit value. When the transmissions corresponds to the log-in credit value, the log-in credit transmission control portion will assert the LI CRED EXH log-in credits exhausted signal.

The buffer count available transmission control portion 41, in response to the buffer count available information received from the destination computer system 11(d), controls a DEST BUFF CNT OK destination buffer count ok signal which, when asserted, enables the source computer system 11(s) to transmit. The buffer count available transmission control portion will maintain the DEST BUFF CNT OK signal negated while the log-in credit transmission control portion 40 is negating the LI CRED EXH log-in credits exhausted signal. In addition, the buffer count available control portion 41 maintains a credits available count, which it decrements in response to transmissions and increments in response to notifications from the destination computer system 11(d) of additional buffers available, and will assert the DEST BUFF CNT OK signal when the credits available count is above zero, and otherwise will negate the signal.

An OR circuit 42 receives an LI CRED OK log-in credits ok signal, which an inverter 43 generates as the complement of the LI CRED EXH log-in credits exhausted signal, and the DEST BUFF CNT OK destination buffer count ok signal from the buffer count available transmission control portion 41, and will assert an OK TO XMIT ok to transmit signal if either the LI CRED OK signal or the DEST BUFF CNT OK signal is asserted. The network interface 14(s) will use the OK TO XMIT signal to control the transmissions over the network 10; in particular, while the OK TO XMIT signal is asserted, the network interface 14(s) is enabled to transmit, but if the signal is negated the network interface 14(s) will be disabled. Thus, the network interface 14(s) will be enabled to transmit if the number of transmissions does not exceed the log-in credits value in register 34, or if the buffer available count information from the destination computer system 11(d) indicates that the destination computer system 11(d) has at least one free buffer.

More specifically, and with reference to FIG. 2B, the log-in credit transmission control portion 40 includes a log-in transmission counter 44 and a comparator 45. The comparator 45 receives at one input a LAT SEL LI CRED latched selected log-in credit signal from the log-in credit register 34 and a LI XMIT CNT log-in transmit count signal from the log-in transmission counter 44. Initially, the log-in transmission counter 44 will be cleared in response to the assertion of the COM OPEN EN communications open enable signal, as described above, and so, if the log-in credit is non-zero, the comparator 45 will generate a negated LI CRED EXH log-in credits exhausted signal. The negated LI CRED EXH signal will, in turn, energize one input of an AND gate 46. As noted above, the negated LI CRED EXH signal is also complemented by an inverter 43 to energize the OR gate 42, enabling the OR gate 42 to assert the OK TO XMIT ok to transmit signal enabling the network interface 14(s) to transmit.

As the network interface 14(s) transmits each message, it will assert a MSG XMIT message transmitted signal. When the MSG XMIT signal is asserted, the AND gate 46 will be energized to enable the log-in transmission counter 44 to increment. This will be repeated for each message transmitted by the network interface 14(s) until the LI XMIT CNT log-in transmit count signal from the counter 44 corresponds to the LAT SEL LI CRED latched selected log-in credit signal from the log-in credit register 34, at which point the comparator 45 will assert the LI CRED EXH log-in credits exhausted signal, indicating that a number of messages has been transmitted corresponding to the selected log-in credits value. The asserted LI CRED EXH signal will disable the AND gate 46, disabling it from advancing. In addition, the asserted LI CRED EXH signal will enable the inverter 43 to negate the LI CRED OK log-in credits ok signal, which, in turn, disables the OR gate 42.

It will be appreciated that, if the selected log-in credit value stored in register 34 is initially zero, the comparator 45 will assert the LI CRED EXH log-in credits exhausted signal from the beginning of the session, in which case the AND gate 46 will not be energized and the inverter 43 will maintain the LI CRED OK signal in the negated state. In this condition, the OR gate 42 will not enable the network interface 14(s) to transmit at this point.

The buffer count available transmission control portion 41 also includes a log-in buffer available received counter 50 and a comparator 51. The comparator 51 receives at one input a LAT SEL LI CRED latched selected log-in credit signal from the log-in credit register 34 and a LI BUFF AVAIL CNT RCVD log-in buffer available count received signal from the log-in buffer available received counter 50. Initially, the log-in buffer available received counter 50 will be cleared in response to the assertion of the COM OPEN EN communications open enable signal, as described above, and so, if the log-in credit is non-zero, the comparator 51 will generate a negated LI BUFF AVAIL EXH log-in buffers available exhausted signal. The negated LI BUFF AVAIL, EXH signal will, in turn, energize one input of an AND gate 52.

As the network interface 14(s) receives each message from the destination computer system 11(d) indicating the availability of a buffer, it will assert a BUF AVAIL RCVD buffer available received signal. When the BUF AVAIL RCVD signal is asserted, while the LI CRED EXH log-in credits exhausted signal is negated the AND gate 52 will be energized to enable the log-in buffer available received counter 50 to increment. This will be repeated for each such message received by the network interface 14(s) until the LI BUFF AVAIL CNT RCVD CNT log-in buffers available count received signal from the counter 50 corresponds to the LAT SEL LI CRED latched selected log-in credit signal from the log-in credit register 34, at which point the comparator 51 will assert the LI BUFF AVAIL EXH log-in buffers available exhausted signal, indicating that the buffers available count information from the destination computer system 11(d) corresponds to the selected log-in credits value stored in the log-in credits register 34.

It will be appreciated that, if the selected log-in credit value stored in register 34 is initially zero, the comparator 51 will assert the LI BUFF AVAIL EXH log-in buffers available exhausted signal from the beginning of the session.

The LI BUFF AVAIL EXH log-in buffers available exhausted signal controls one input of an AND gate 53 and an available credits counter count control circuit 54. The AND gate 53, in response to the assertion of both the LI CRED EXH log-in credits exhausted signal and the LI BUFF AVAIL EXH log-in buffers available exhausted signal, will be energized to enable one input of an AND gate 61. It will be appreciated that the AND gate 53 will be energized if the source computer system 11(s) has transmitted a number of messages corresponding to the log-in credits value in register 34 and if it has received a number of notifications indicating buffers available from the destination computer system 11(d) corresponding to the log-in credits value in register 34.

The available credits counter count control circuit 54 comprises an AND gate 55 and an AND gate 56, both of which serve to control an available credits counter 57. The available credits counter is initially cleared in response to the assertion of the COM OPEN EN communications open enable signal at the beginning of a communications session. The AND gate 55 receives at one input the LI BUFF AVAIL EXH log-in buffers available exhausted signal and at its other input the MSG XMIT signal, which, as noted above, the network interface 14(s) will assert when it transmits a message to the destination computer system 11(d). When the MSG XMIT signal is asserted, while the LI BUFF AVAIL EXH signal is also asserted, the AND gate 55 will be asserted to enable the available credits counter to decrement. Thus, for each message transmitted by the network interface, after it has transmitted a number of messages corresponding to the log-in credits value stored in the register 34, the AND gate 55 will enable the available credits counter 57 to decrement.

The AND gate 56 enables the available credits counter to increment. When the BUF AVAIL RCVD buffers available received signal is asserted, while the LI BUFF AVAIL EXH log-in buffers available exhausted signal is also energized, the AND gate 56 will be asserted to enable the available credits counter 57 to increment. Thus, for each message received by the network interface 14(s) containing a notification from the destination computer system 11(s) that it has a buffer is available, after it has received buffer available notifications corresponding to the log-in credits value stored in the register 34, the AND gate 56 will enable the available credits counter 57 to increment.

The available credits counter 57 generates an AVAIL CRED available credits signal, which is coupled to a zero detect circuit 60. When the zero detect circuit 60 determines that the AVAIL CRED signal represents a zero value it generates an asserted NO CRED no credits signal, in which case, an inverter 62, in turn, generates a negated CRED AVAIL credits available signal. As noted above, if both the LI CRED EXH log-in credits exhausted signal and the LI BUFF AVAIL EXH log-in buffers available exhausted signal are asserted, the AND gate 53 is enabling one input of the AND gate 61. However, if the CRED AVAIL credits available signal from the inverter 62 is negated, the AND gate 61 remains de-energized and the OR gate will maintain the OK TO XMIT ok to transmit signal in the negated condition, in turn disabling the network interface 14(s) from transmitting.

On the other hand, when the zero detect circuit 60 determines that the AVAIL CRED signal represents a non-zero value, it generates a negated NO CRED no credits signal, in which case, an inverter 62, in turn, generates an asserted CRED AVAIL credits available signal. As noted above, if both the LI CRED EXH log-in credits exhausted signal and the LI BUFF AVAIL EXH log-in buffers available exhausted signal are asserted, the AND gate 53 is enabling one input of the AND gate 61. If the CRED AVAIL credits available signal from the inverter 62 is also asserted, the AND gate 61 is energized and the OR gate will assert the OK TO XMIT ok to transmit signal, in turn enabling the network interface 14(s) to transmit.

Thus, the log-in credit transmission control portion 40 enables the network interface 14(s) of the source computer system 11(s) to initially transmit a number of messages corresponding to the log-in credits value selected for the destination computer system 11(d) and stored in the register 34 at the beginning of a communications session. The buffer count available transmission control portion 41, on the other hand, enables the network interface to continue transmitting after it has transmitted a number of messages corresponding to the log-in credits value, while the total number of messages (including the initial messages) is less than the number of buffers available as indicated by the destination computer system 11(d).

As noted above, FIG. 3 depicts a schematic logic diagram of a destination buffer count available circuit 23 used by the destination computer system 11(d) to determine the number of buffers that it has available and control the transmission of buffer available count information to the source computer system 11(s). With reference to FIG. 3, the destination buffer count available circuit 23 includes an available receive buffer counter 70, a releasable receive buffer counter 71, a zero detection circuit 72 and a control logic 73. The available receive buffer counter 70 is initially loaded with a value corresponding to the maximum number of communications buffers which the computer system, as a destination computer system 11(d), will make available to communications. As a receive buffer is allocated to receive information, the network interface 14(d) will assert a RCV BUFFER USED receive buffer used signal, which will enable the available receive buffer counter 70 to decrement, and as a receive buffer is freed, by transferring its contents to the local computer 13(d) for processing, the network interface 14(d) will assert a RCV BUFFER FREE receive buffer free signal which will enable the available receive buffer counter 70 to increment. Thus, the available receive buffer counter 70 maintains a count corresponding to the number of buffers which are available for communications, and generates a RCV BUFF AVAIL receive buffers available signal representative thereof.

When the destination computer system 11(d) opens a communications session with the source computer system 11(s), the control logic 73 asserts a LD RCV BUF AVAIL load receive buffer available signal, which enables the releasable receive buffer counter 71 to load the RCV BUF AVAIL signal from the available receive buffer counter 70. The releasable receive buffer counter 71, together with the control logic 73, controls the transmission by the destination computer system 11(d) of buffer available notifications. The releasable receive buffer counter 71 will be incremented in response to the assertion of the RCV BUFFER FREE receive buffer free signal, which, as described above, occurs when a receive buffer's contents are transferred to the local computer 13(d), and, as described below, will be decremented when a buffer available notification is sent to the source computer system 11(s). Accordingly, the releasable receive buffer counter 71 maintains a running count of the number of releasable buffers, that is, the number of available buffers for which buffer available notifications have not been sent In particular, the releasable receive buffer counter 71 generates a REL RCV BUF CNT releasable receive buffer count signal which, while it has a non-zero value, enables the zero detect circuit 72 to generate an asserted REL RCV BUF AVAIL releasable receive buffer available signal. In response to the asserted REL RCV BUF AVAIL signal, and a SND BUF AVAIL SLOT send buffer available slot signal from the network interface 14(d) indicating that it is then transmitting a portion of a message in which the buffer available notification is to be loaded, the control logic 73 asserts a SND BUFF AVAIL send buffer available signal used by the network interface 14(d) as the buffer available notification. The assertion of the SND BUF AVAIL signal also enables the releasable receive buffer counter 71 to decrement.

The control logic 73 will iteratively assert the SND BUF AVAIL signal, in response to successive assertions of the SND BUF AVAIL SLOT signal from the network interface 14(d), as long as the releasable receive buffer counter 71 provides REL RCV BUF CNT releasable receive buffer count signals defining a non-zero value. If the releasable receive buffer counter 71 decrements to zero in response to successive assertions of the SND BUFF AVAIL send buffer available signal from the control logic 73, the zero detect circuit 72, in turn, will negate the REL RCV BUF AVAIL releasable receive buffer available signal, which disables the control logic 73 from asserting the SND BUFF AVAIL send buffer available signal. Contemporaneously, as described above, the releasable receive buffer counter 71 will be incremented in response to assertion of the RCV BUFFER FREE signal when buffers are freed, and when the counter 71 again increments above zero the zero detect circuit 72 will again assert the REL RCV BUF AVAIL signal to enable the control logic 73 to resume asserting the SND BUF AVAIL send buffer available signal. This will continue until the communications session ends.

It will be appreciated that the invention provides a number of advantages. In particular, it enables the source and destination computer systems 11(s) and 11(d) to efficiently control flow of communications between them in a communications session over the network 10, with a minimum of circuitry required to store the various log-in credit values which may be used for the possibly large number of destinations. In addition, it selectively reduces the amount of overhead required at the beginning of a communication session, by allowing the source computer system 11(s) to selectively use one of a plurality of log-in credits, selected based on the particular destination computer system 11(d) with which it opens a communications session, and transmit a number of messages corresponding to the selected log-in credits prior to getting flow-control information directly from the destination computer system 11(d).

It will be appreciated that the log-in credits value that is associated with each particular computer system 11(d) may be provided by a network administrator, or it may be provided by the computer system itself. In addition, the value may be fixed, or it may be modifiable by the associated computer system based, for example, on its computational and communications load at any particular point in time.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A network interface comprising:
   A. a network session control for establishing a communications session between a source device and a destination device;
   B. a message transmitter for transmitting messages from said source device to said destination device; and
   C. a message transmission control circuit for controlling transmission of messages by said message transmitter, the message transmission control circuit initially enabling said network interface to transmit a number of messages corresponding to one of a plurality of log-in credit values selected in response to the particular destination device with which the communications session is established, and thereafter enabling the network interface to transmit messages based on flow control information received from the selected device.

2. A network interface as defined in claim 1 in which said message transmission control circuit includes:
   A. a log-in credit store including a plurality of log-in credit store entries each storing a log-in credit value;
   B. a log-in credit selector for selecting one of said log-in credit store entries associated with the destination device; and
   C. a log-in transmission control for enabling the message transmitter to transmit a number of messages corresponding to the log-in credit value in the selected log-in credit store entry as selected by said log-in credit selector at the beginning of said communications session.

3. A network interface as defined in claim 2 in which the log-in transmission control includes:
   A. a selected log-in credit value store for receiving and storing the log-in credit value from the selected log-in credit store entry, the selected log-in credit value store providing a selected log-in credit value;
   B. a message counter for providing a session message count identifying the number of messages transmitted by the message transmitter, the session message counter being incremented in response to transmission of messages by said message transmitter; and
   C. a comparator for receiving the selected log-in credit value and the session message count and generating a log-in credits exhausted signal when the session message count corresponds to the selected log-in credit value, the log-in credits exhausted signal controlling message transmission by the message transmitter.

4. A network interface as defined in claim 1, the network interface further including a message receiver for receiving messages from the destination device, at least some of said messages including credit information, said message transmission control circuit including:

A. a session credits counter for generating a session credits count;

B. a session credits counter control for controlling the session credits counter in relation to the credit information in messages received from the destination device and transmission of messages by said message transmitter; and C. a session transmission control for enabling the message transmitter to transmit messages in relation to the session credits count provided by the session credits counter.

5. A network interface as defined in claim 4 in which said session credits counter control enables said session credits counter to increment in response to said credit information and decrement in response to transmission of messages by said message transmitter.

6. A network interface as defined in claim 4 in which said message transmission control circuit further includes:

A. a log-in credit store including a plurality of log-in credit store entries each storing a log-in credit value;

B. a log-in credit selector for selecting one of said log-in credit store entries associated with the destination device; and C. a log-in transmission control for enabling the message transmitter to transmit a number of messages corresponding to the log-in credit value in the selected log-in credit store entry as selected by said log-in credit selector at the beginning if said communications session.

7. A network interface as defined in claim 6 in which the log-in transmission control includes:

A. a selected log-in credit value store for receiving and storing the log-in credit value from the selected log-in credit store entry, the selected log-in credit value store providing a selected log-in credit value;

B. a log-in message counter for providing a log-in message count identifying the number of messages transmitted by the message transmitter, the session message counter being incremented in response to transmission of messages by said session message counter; and C. a comparator for receiving the selected log-in credit value and the log-in message count and generating a log-in credits exhausted signal when the log-in message count corresponds to the selected log-in credit value, the log-in credits exhausted signal controlling message transmission by the message transmitter.

8. A network interface as defined in claim 7 further including a log-in message counter control for disabling said log-in message counter in response to the log-in credits exhausted signal.

9. A network interface as defined in claim 7 in which said session credits counter control is controlled in response to the log-in credits exhausted signal.

10. A network interface as defined in claim 7 in which said session credits counter control further controls said session credits counter in relation to the selected log-in credit value.

11. A network interface as defined in claim 10 in which said session credits counter control includes:

A. a credits received counter incremented in response to the credit information received from the destination device for providing a credits received count value;

B. a comparator for receiving the selected log-in credit value and the credits received count value and generating a log-in credit available exhausted signal when the credit count value corresponds to the selected log-in credit value; and C. a session credits counter adjustment control for controlling the session credit counter in relation to the credit information in messages received from the destination device and the selected log-in credit value, so that the session credit counter will be controlled in relation to the credit information after the credit information indicates a number of credits corresponding to the log-in credit value.

12. A method of controlling transmission of messages between a source device and a destination device in a network, the method comprising the steps of:

A. establishing a communications session between said source device and said destination device;

B. transmitting messages from said source device to said destination device; and C. enabling a number of messages to be transmitted corresponding to one of a plurality of log-in credit values selected in response to the particular destination device with which the communications session is established, and thereafter enabling transmission of messages based on flow control information received from the selected device.

13. A method as defined in claim 12 in which said message transmission control step includes the steps of:

A. selecting one of a plurality of log-in credit values associated with the destination device; and B. enabling a number of messages to be initially transmitted, the number corresponding to the log-in credit value in the selected log-in credit store entry as selected by said log-in credit selector at the beginning if said communications session.

14. A method as defined in claim 13 in which the initial message transmission step includes the steps of:

A. providing a session message count identifying the number of messages transmitted by the source device, the session message count value being incremented in response to transmission of messages; and B. generating a log-in credits exhausted signal when the session message count corresponds to the selected log-in credit value; and C. controlling message transmission by the source device in relation to the log-in credits exhausted signal.

15. A method as defined in claim 12, said source device further receiving messages from the destination device, at least some of said messages including credit information, said message transmission control step including the steps of:

A. generating a session credits count value in relation to the credit information in messages received from the destination device and transmission of messages by said source device; and B. controlling transmission of messages by said source device in relation to the session credits count value.

16. A method as defined in claim 15 in which said session credits count value generation step includes the steps of incrementing the session credits count value in response to said credit information and decrementing the session credits count value in response to transmission of messages by said source device.

17. A method as defined in claim 15 in which said message transmission control step further including the steps of:

A. selecting one of a plurality of log-in credit values associated with the destination device; and B. enabling a number of messages to be initially transmitted, the number corresponding to the log-in credit value in the selected log-in credit store entry as selected by said log-in credit selector at the beginning if said communications session.

18. A method as defined in claim 17 in which the initial messages transmission step includes the steps of:
   A. providing a log-in message count value identifying the number of messages transmitted by the source device, the log-in message count value being incremented in response to transmission of messages; and
   B. generating a log-in credits exhausted signal when the log-in message count corresponds to the selected log-in credit value; and
   C. controlling message transmission by the source device in relation to the log-in credits exhausted signal.

19. A method as defined in claim 18 further comprising the step of disabling incrementation of said log-in message count value in response to the log-in credits exhausted signal.

20. A method as defined in claim 18 in which said session credits count value generation step is further controlled in response to the log-in credits exhausted signal.

21. A method as defined in claim 18 in which said session credits count value generation step further includes the step of controlling said session credits count value in relation to the selected log-in credit value.

22. A method as defined in claim 21 in which said session credits count value generation step includes the steps of:
   A. incrementing said session credits count value in response to the credit information received from the destination device for providing a credits received count value;
   B. generating a log-in credit available exhausted signal when the credit count value corresponds to the selected log-in credit value; and
   C. controlling the session credit count value in relation to the credit information in messages received from the destination device and the selected log-in credit value, so that the session credit count value will be controlled in relation to the credit information after the credit information indicates a number of credits corresponding to the log-in credit value.

* * * * *